Feb. 11, 1936.  L. T. PAGE  2,030,117
WINDSHIELD HEATER
Filed July 14, 1934
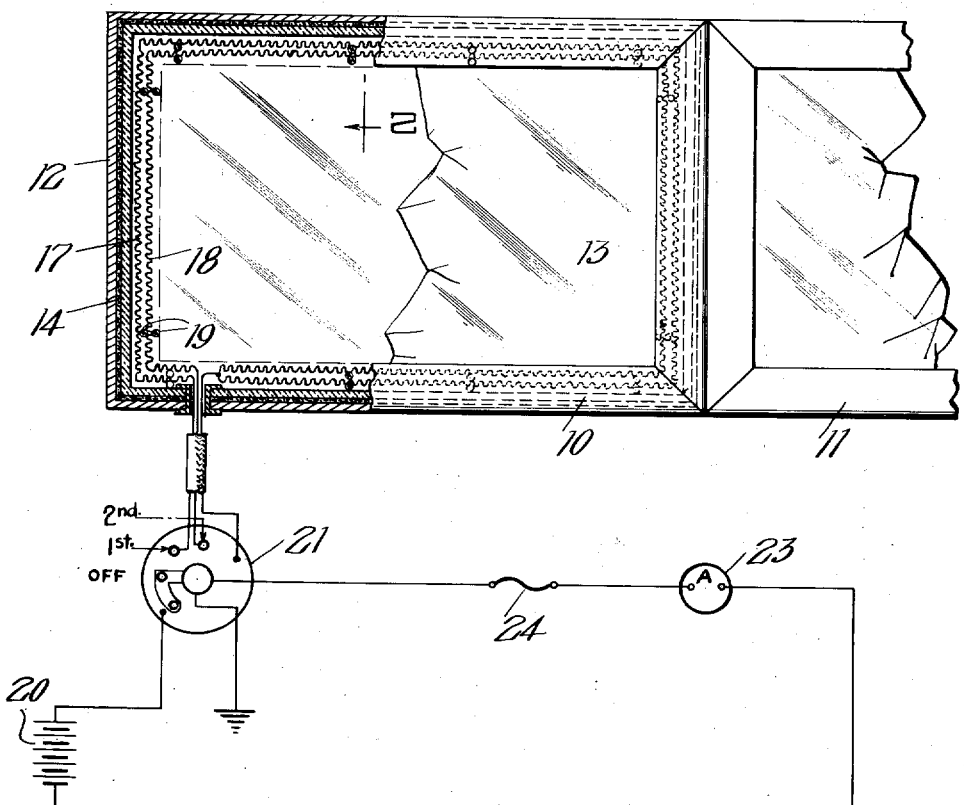
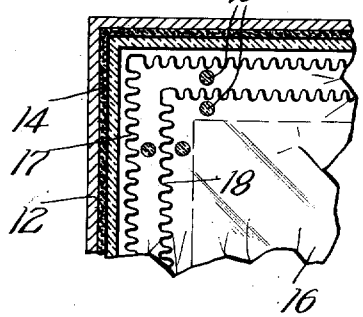
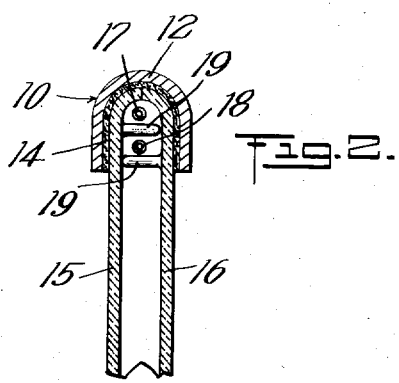
INVENTOR
Luther T. Page
BY
ATTORNEY Patented Feb. 11, 1936

2,030,117

UNITED STATES PATENT OFFICE 2,030,117

WINDSHIELD HEATER

Luther T. Page, Richmond, Va.

Application July 14, 1934, Serial No. 735,121

2 Claims. (Cl. 219—19)

Among the principal objects which the present invention has in view are: to provide a complete sectional unit of transparent glass in a windshield frame and means for providing heat therein; to utilize such means whereby heat may be transmitted when desired; to provide means to regulate the amount of current to be utilized; to provide one or more heating elements and held apart by structural means in the manufacture of the unit; and to secure simplicity of construction and operation.

In the drawing:

Figure 1 is an elevation of a duplex windshield, one section of the windshield being wholly provided with the heating elements, said section being partly broken away and showing the heating elements, also showing a source of electrical supply employed in carrying out the invention;

Figure 2 is an enlarged sectional view shown as taken on the line 2—2 of Figure 1; and Figure 3 is an enlarged detail sectional view of one corner of the windshield and similar to Figure 1.

As seen in the drawing, my improved windshield heater will make it possible for easy installation in cars being manufactured as well as for cars in use.

As seen in Figure 1, the windshield comprises sections 10 and 11 and as will be readily seen, the section 10 represents that part of the windshield which is directly in front of the driver of an automobile. However, if desired, both sections may be easily accommodated with the invention. My improved heater is adaptable for winter driving, whereby the use of the car can be enhanced for constant driving and thereby eliminate the fears of danger while driving, particularly from snow or ice forming on the windshield to obstruct the view of the driver.

In carrying out the invention, and referring more particularly to Figures 1 and 3 I have shown section 10 of the windshield broken away at one corner to more clearly show the invention. Said section 10 in construction has the usual casing or frame 12 to protect the glass 13, and between the casing and glass is provided a suitable cushioning means. Such means may preferably be a material non-conductive to heat, such as asbestos 14 and entirely covers that portion of the glass encased by the casing or frame 12.

It is preferable that the glass 13 be molded and in two layers 15 and 16 to provide a windshield section of double thickness. The edges of the said layers turn inward normal to the general plane of the layer, and, as the inturned edges of one layer are juxtaposed upon the inturned edge of the other layer, providing a peripherally closed space between the said layers. Preferably, the engagement between said edges, supplemented by the overlying cushioning means, is substantially airtight. Within the said closed space between said layers, and preferably next the inturned edges thereof is provided heating means. As here specifically illustrated, said heating means comprises a plurality of heating elements or coils 17 and 18, one adjacent the other prior to assembly of the glass layers. Said heating elements or coils preferably extend the full peripheral distance adjacent the outer edge of the section, so as not to obstruct the view through the section and preferably being hidden from view by virtue of the casing 12.

In order that the heating elements or coils 17 and 18 do not inadvertently come in contact with each other during use and thereby cause a short circuit, I have devised means in the construction of the glass layers to keep the said elements separated. Such means may conveniently be projecting tips 19 within the space between the layers normal to said layers and spaced at suitable distances from each other so as to keep the heating elements substantially in parallel relationship. It will be noted that the said tips are preferably molded as integral parts of the glass and each of a length substantially equal to the thickness of the space between the layers. Said tips are furthermore staggered so as to have the one row thereof nearest the edge projecting from the layer 10 which will act as a support for the outermost heating element or coil 17 and the other row of tips projecting from the layer 16 and support the innermost heating element or coil 18.

Any suitable means may be employed for supplying the source of electrical supply to the heating elements, and one such means may be in the nature of current from the battery 20 of the motor vehicle. Since I have found it convenient to use two heating elements, it does not necessarily mean that both elements need be in operation at the same time. To that end I have shown a switch 21 which may conveniently be mounted to the dashboard of the motor vehicle and accessible to the driver at all times. Should a coating of snow, ice, fog or the like be light on the windshield, the operator may then turn the switch to the position marked "1st" which will cause the one heating element 17 to function and thereby quickly dissipate any moderate coating appearing on the windshield and keep the same clear until the switch is turned to the "off" position. Should the coating be of heavy proportions, the switch may then be turned to the position marked "2nd" thereby connecting both heating elements 17 and 18 in parallel to the source and causing the heating means to function at full capacity or with a greater amount of heat than when only one element was in operation. The heat obtained is effective upon the outside of the windshield. By virtue of the provision of two heating elements in parallel, should one burn out, there will still be another element to continue with until repair can be effected.

Referring to Figure 1, I have shown diagrammatically a circuit for supplying the current to the heating elements 17 and 18, and in this respect the wires from the said heating elements are suitably attached to the switch 21. Current from the battery 20 passes to the switch by wire 22 through an ammeter 23 also on the dashboard, through a fuse 24 and thence to the switch.

While I have shown and described the invention as adaptable for use on automobiles I do not wish to be understood as limiting myself to that particular use, except as set forth in the following claims when construed in the light of the prior art.

I claim:

1. A heated windshield as characterized comprising a plurality of layers of transparent glass, said layers at their outer edges being turned inwardly and toward each other thereby providing a peripherally continuous seat at said outer edges and an open space between the other parts of the layers for providing a clear vision, each of said layers having inwardly projecting posts with respect to each other extending substantially the distance of the open space and being integral parts of said layers and retaining the layers in constant spaced relation, a plurality of heating elements extending peripherally adjacent the inside of the several peripheral edges of the layers, said elements providing each a plurality of sections and each section being parallel to the next adjacent peripheral edge of the layers, and passing next to the posts said sections being held in spaced relation by the said integral posts.

2. A heated windshield as characterized comprising a plurality of layers of transparent glass, said layers at their outer edges being turned inwardly and toward each other thereby providing a peripherally continuous seat at said outer edges and an open space between the other parts of the layers for providing a clear vision, each of said layers having inwardly projecting posts with respect to each other extending substantially the distance of the open space and being integral parts of said layers and retaining the layers in constant spaced relation, a plurality of heating elements extending peripherally adjacent the inside of the several peripheral edges of the layers, said elements providing each a plurality of sections and each section being parallel to the next adjacent peripheral edge of the layers, and passing next to the posts said sections being held in spaced relation by the said integral posts and means exteriorly of said layers extending parallel to said sections and overlying the posts and heating elements whereby said posts and elements are completely hidden from view.

LUTHER T. PAGE.